United States Patent
Maeda

(10) Patent No.: US 6,852,433 B2
(45) Date of Patent: Feb. 8, 2005

(54) RARE-EARTH OXIDE THERMAL SPRAY COATED ARTICLES AND POWDERS FOR THERMAL SPRAYING

(75) Inventor: Takao Maeda, Takefu (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 10/618,679

(22) Filed: Jul. 15, 2003

(65) Prior Publication Data

US 2004/0013911 A1 Jan. 22, 2004

(30) Foreign Application Priority Data

Jul. 19, 2002 (JP) ........................................ 2002-211400

(51) Int. Cl.⁷ .......................... B32B 15/04; B32B 9/04
(52) U.S. Cl. ...................... 428/697; 428/701; 428/702; 428/699; 428/469; 428/698
(58) Field of Search ............................... 428/469, 701, 428/702, 699, 698, 697; 106/474, 403, 479, 436

(56) References Cited

U.S. PATENT DOCUMENTS

| | | |
|---|---|---|
| 4,502,983 A | 3/1985 | Omori et al. |
| 5,993,970 A | 11/1999 | Oscarsson et al. |
| 6,080,232 A * | 6/2000 | Sperlich et al. .............. 106/436 |
| 6,582,814 B2 * | 6/2003 | Swiler et al. ................ 428/328 |
| 2002/0177001 A1 | 11/2002 | Harada et al. |

FOREIGN PATENT DOCUMENTS

JP  2001-164354 A  6/2001

OTHER PUBLICATIONS

U.S. Appl. No. 10/101,612, filed Mar. 21, 2002, Takai et al.
U.S. Appl. No. 10/173,030, filed Jun. 18, 2002, Takai et al.
U.S. Appl. No. 10/173,031, filed Jun. 18, 2002, Takai et al.

* cited by examiner

Primary Examiner—Jennifer McNeil
(74) Attorney, Agent, or Firm—Birch, Stewart, Kolasch & Birch, LLP

(57) ABSTRACT

A rare-earth oxide thermal spray coated article comprising a substrate and a coating layer formed by thermally spraying a rare-earth oxide thermal spraying powder onto a surface of the substrate, said coating layer being of a gray or black color having, in the L*a*b* color space, an L* value of up to 50, an a value of −3.0 to +3.0, and a b* value of −3.0 to +3.0.

7 Claims, No Drawings

RARE-EARTH OXIDE THERMAL SPRAY COATED ARTICLES AND POWDERS FOR THERMAL SPRAYING

BACKGROUND OF THE INVENTION

1. Field of the Invention

The present invention relates to articles which have been thermal spray coated with rare-earth oxide powders. The present invention also relates to rare-earth oxide powders for thermal spraying.

2. Prior Art

Because rare-earth oxides are relatively stable at high temperatures, articles which are thermal spray coated with rare-earth oxides to increase the life of the article are being developed for heat-resistant and plasma erosion resistant applications. Examples of such articles include sintering trays used when sintering carbide tools, and components for plasma etching systems that employ halogen gases.

Problems arise because rare-earth oxides such as yttria are generally white in color. When rare-earth oxides are used in trays for sintering carbide tools, constituents of the carbide (e.g., tungsten carbide and carbon) stick to the white surface and appear to contaminate the tray as foreign matter. Moreover, such contamination creates black and white areas on the tray, which results in a non-uniform radiation efficiency during high-temperature sintering. In the sintering of slender, elongated tools such as microdrills in particular, such non-uniformity tends to cause warping.

When rare-earth oxides are used in components for plasma etching chamber using halogen gases, resist decomposition product residues adhere to the component following use, creating areas of brown discoloration. Because such areas invariably receive more attention in the cleaning operation, in spite of being endowed with good plasma erosion resistance and thus inherently greater longevity, the component tends to be excessively cleaned, shortening its useful life.

SUMMARY OF THE INVENTION

It is therefore one object of the invention to provide articles having a thermal spray coating layer that imparts increased uniformity of radiation at elevated temperatures and thus causes minimal warping and undergoes little or no local color change with use. Another object of the invention is to provide rare-earth oxide powders for thermal spraying which make it possible to produce such spray coated articles.

The above problems arise from the fact that rare-earth oxides basically exhibit a white color. One possible solution is to add another element to change the rare-earth oxide to a gray or black color. However, when such a modified rare-earth oxide thermal spraying powder is used in a sintering tray, it is necessary to prevent the admixture of foreign matter in the objects sintered on the tray. Likewise, plasma erosion resistant articles obtained by thermal spray coating a rare-earth oxide powder onto a substrate are used primarily in semiconductor fabrication processes, and must therefore be non-contaminating. Given the need to hold down the amount in which such an additional element is added, we have sought a way of including a small amount of such an element to form a rare-earth oxide thermal sprayed layer which is gray or black in color. We have discovered the addition of carbon, titanium or molybdenum, particularly in an amount of 0.1 to 2% by weight, for carbon, or in an amount of 1 to 1000 ppm for titanium and molybdenum, to be effective for this purpose. We have also found that thermally spray coated articles having a gray or black color can be manufactured by using a rare-earth oxide thermal spraying powder of a gray or black color having, in the $L^*a^*b^*$ color space, an $L^*$ value of up to 50, an $a^*$ value of −3.0 to +3.0 and a $b^*$ value of −3.0 to +3.0.

Accordingly, the invention provides a rare-earth oxide thermal spray coated article comprising a substrate and a layer formed by thermally spraying a rare-earth oxide thermal spraying powder onto a surface of the substrate, said surface layer being of a gray or black color having, in the $L^*a^*b^*$ color space, an $L^*$ value of up to 50, an $a^*$ value of −3.0 to +3.0, and a $b^*$ value of −3.0 to +3.0.

In this case, the surface layer preferably contains carbon, titanium or molybdenum.

The present invention also provides a rare-earth oxide powder for thermal spraying, which powder is of a gray or black color having, in the $L^*a^*b^*$ color space, an $L^*$ value of up to 50, an $a^*$ value of −3.0 to +3.0 and a $b^*$ value of −3.0 to +3.0.

DETAILED DESCRIPTION OF THE INVENTION

The rare-earth oxide used in the invention may be an oxide of one or more element selected from group 3A rare-earth elements such as yttrium (Y). An oxide containing one or more heavy rare-earth element selected from among yttrium, gadolinium, ytterbium and lutetium is preferred. Alternatively, use can be made of a double oxide containing the above-described rare-earth oxide in combination with one or more element selected from among such elements as aluminum, silicon, zirconium and indium.

The rare-earth oxide powder for thermal spraying of the invention has an average particle size of preferably 10 to 100 $\mu$m. At a size smaller than 10 $\mu$m, the particles tend to evaporate within the heat source (e.g., a plasma flame) during thermal spraying and disperse, which may result in a corresponding loss of powder. On the other hand, at a size greater than 100 $\mu$m, the particles may not melt completely within the plasma flame during thermal spraying. Such powder that remains in an unfused state may lower the adhesive strength of the thermal sprayed coating to the substrate.

"Average particle size," as used herein, refers to the D50 value in the particle size distribution measured by a laser diffraction method.

The thermal spraying powder of the invention is formed by including, in a rare-earth oxide powder that generally has a white color (such as yttria, which has the $L^*a^*b^*$ color space values $L^*=93.2$, $a^*=0.52$, $b^*=0.66$), a material which imparts a gray or black color so as to give a modified powder with a gray or black color having, in the $L^*a^*b^*$ color space, a $L^*$ value of up to 50, an $a^*$ value of −3.0 to +3.0 and a $b^*$ value of −3.0 to +3.0.

The gray or black color-imparting material is preferably carbon, titanium or molybdenum. The inclusion of 0.1 to 2% by weight, more desirably 0.2 to 1.8% by weight of carbon is especially preferred. For titanium or molybdenum, the inclusion of 1 to 1000 ppm, more desirably 1 to 800 ppm is also preferred.

The means for incorporating carbon into the rare-earth oxide powder is not critical. One method that may be employed for this purpose involves preparing a slurry from a rare-earth oxide powder having a white color and a carbon source-containing solution, mixing the slurry for 5 to 60 minutes, then subjecting it to drying and roasting. The carbon source may be, for example, carbon, an aliphatic hydrocarbon or an aromatic hydrocarbon. If necessary, the carbon source may be dissolved or mixed in water or an organic solvent. For example, use may be made of phenol diluted with alcohol or of a water-soluble organic substance such as sucrose, although anything that will serve as a source of carbon when roasted is acceptable for this purpose. Carbon addition may be achieved by direct mixture as described above, or by some other suitable method such as dipping, coating or spraying. Following mixture and drying of the carbon and the rare-earth oxide powder, it is desirable to roast these materials in nitrogen gas at 500 to 900° C. It is especially advantageous to subsequently fire the roasted powder in a vacuum or a reducing atmosphere at an elevated temperature of 1,500 to 1,700° C. After firing, the powder is screened, thereby giving a rare-earth oxide powder for thermal spraying that has a gray or black color. One key to achieving the desired result is to control the concentration in which the phenol or sucrose is added as the carbon source so that the carbon content in the thermal spraying powder becomes 0.1 to 2% by weight. At a carbon content of less than 0.1% by weight, the radiation efficiency during high-temperature firing may become uneven. On the other hand, at a carbon content greater than 2% by weight, excessive carbon is present and often leads to contamination.

The means for incorporating titanium or molybdenum into the rare-earth oxide powder is also not critical. One method that may be employed for this purpose involves preparing a slurry from a rare-earth oxide powder, polyvinylalcohol (PVA), water, and a water-soluble salt of titanium or molybdenum such as titanium chloride, titanium ammonium, molybdenum chloride or molybdenum ammonium mixing the slurry, and subjecting it to granulating and drying with a spray drier. Then, the resulting powder is subjected to firing at a temperature of 1500 to 1800° C. in a vacuum or a reducing atmosphere to thereby obtain a rare-earth oxide powder for thermal spraying that has a gray or black color. The content of titanium or molybdenum in the thermal spraying powder is preferably 1 to 1000 ppm. If the content is less than 1 ppm, the desired colored thermal spray coating layer is not obtained. If the content is more than 1000 ppm, contamination may be led when the thermal spray coated article is used as a semiconductor manufacturing apparatus.

The thermal spray coated article of the invention is composed of a substrate and a thermal spray coating layer that is formed by thermally spraying the above-described rare-earth oxide thermal spraying powder onto a surface of the substrate.

The substrate is not critical. Illustrative examples include metals and alloys composed primarily of aluminum, iron, silicon, chromium, zinc, zirconium or nickel; ceramics such as metal nitrides, metal carbides and metal oxides (e.g., alumina, aluminum nitride, silicon nitride, silicon carbide); and glasses (e.g., quartz glass).

The thermal spray coating layer on the substrate surface has a thickness of preferably 50 to 500 $\mu$m, and most preferably 150 to 300 $\mu$m. At a layer thickness of less than 50 $\mu$m, in applications where the thermal spray coated article bearing this layer is used as a corrosion-resistant article, it may need to be replaced if even slight corrosion arises. On the other hand, at a coating layer thickness greater than 500 $\mu$m, the coating layer is too thick and may undergo separation.

The thermal spray coated article of the invention can be fabricated by using a suitable thermal spraying process, such as plasma spraying or low-pressure plasma spraying, to form a layer of the above-described rare-earth oxide thermal spraying powder on the surface of the substrate. Illustrative, non-limiting examples of the plasma gas that may be used include nitrogen/hydrogen, argon/hydrogen, argon/helium and argon/nitrogen. No particular limitation is imposed on the thermal spraying conditions. These conditions may be suitably selected in accordance with the particular materials used, such as the substrate and the rare-earth oxide thermal spraying powder, as well as other considerations, including the intended use for the thermal spray coated article to be obtained.

It is desirable for the thermal spray coated article thus obtained to be of a color having, in the L*a*b* color space, an L* value of up to 50, an a* value of −3.0 to +3.0, and a b* value of −3.0 to +3.0.

By specifying the L*a*b* color in this way, warping and cracking of the workpiece, such as a tray, are minimized. Moreover, when the thermal spray coated article is taken out and cleaned, portions of the article are not subjected to excessive cleaning, enabling it to achieve its inherently long service life.

In the practice of the invention, the L*a*b* color can be measured in accordance with JIS Z-8729 using, for example, a Chroma Meter CR-200 by Minolta Co., Ltd.

EXAMPLES

The following examples and comparative examples are provided to illustrate the invention and are not intended to limit the scope thereof. All percentages are by weight.

Example 1

One liter of a phenol solution diluted to 3% with ethanol was added to 1 kg of ytterbium oxide powder (average particle size, 40 $\mu$m). The resulting slurry was mixed for 5 minutes, dried, then roasted at 800° C. for 2 hours in a stream of nitrogen. The resulting granulated powder was fired at a reduced pressure (less than $1 \times 10^{-2}$ Torr) and 1,600° C. for 2 hours, thereby forming a black thermal spraying powder. This thermal spraying powder had a L*a*b* color defined by the following values: L*=45.26, a*=−0.23, and b*=−0.75. The powder had a carbon content of 1.2%.

This thermal spraying powder was applied onto carbon articles to a thickness of 120 $\mu$m by atmospheric pressure plasma spraying using an argon/hydrogen mixed gas, thereby producing black ytterbium oxide sintering trays. Measurement of the L*a*b* color of this thermal sprayed layer yielded the following values: L*=48.3, a*=−0.82, b*=−0.73. The carbon content in the sprayed layer was 0.9%. The trays were stacked in 3 tiers, and carbide components having a diameter of 4 mm and a length of 50 mm were set between the tiers and fired at 1,400° C. No warping arose in the cemented carbide components.

Comparative Example 1

Ytterbium oxide powder (average particle size, 40 $\mu$m) was applied to carbon articles by atmospheric pressure plasma spraying using an argon/hydrogen mixed gas, thereby producing white ytterbium oxide sintering trays. Measurement of the L*a*b* color of this thermal sprayed layer yielded the following values: L*=92.4, a*=0.56, b*=0.88. The carbon content in the thermal sprayed layer was 0.01%. The trays were stacked in tiers and pre-fired at 1,400° C. Black areas of carbon adhesion appeared on the white surface of the trays. The trays were stacked, and carbide components having a diameter of 4 mm and a length of 50 mm were set between the tiers and fired at 1,400° C. Warping arose in the cemented carbide components.

Example 2

Yttrium oxide powder (average particle size, 35 µm) was immersed in a 30% aqueous solution of sucrose, then stirred for 10 minutes, filtered and dried. The dried powder was fired at 1,630° C. in a stream of argon, then screened with a #100 sieve, thereby producing a thermal spraying powder having a black color. Measurement of the L*a*b* color of this thermal spraying powder yielded the following values: L*=41.12, a*=−0.64, b*=−0.66. The carbon content was 1.0%.

This thermal spraying powder was applied to aluminum articles by atmospheric pressure plasma spraying using an argon/hydrogen mixed gas at an argon flow rate of 40 L/min and a hydrogen flow rate of 5 L/min, thereby forming coated articles bearing a thermal sprayed layer having a thickness of about 200 µm and a black color. Measurement of the L*a*b* color of this thermal sprayed layer yielded the following values: L*=43.52, a*=−0.52, b*=−0.60. The carbon content was 0.7%. These coated articles were set in a reactive ion plasma etching system together with a resist-coated silicon wafer, and subjected to a plasma exposure test at a frequency of 13.56 MHz and a plasma output of 1,000 W. The type of gas used in the test was $CF_4+O_2$ (20 vol %), the flow rate was 50 sccm, and the gas pressure was 50 mTorr. No local color changes in the surface layer were apparent upon visual inspection. Measurement of the L*a*b* color yielded the following values: L*=45.20, a*=−0.71, b*=−0.55.

Comparative Example 2

Yttrium oxide powder (average particle size, 35 µm) was applied to aluminum articles by atmospheric pressure plasma spraying using an argon/hydrogen mixed gas at an argon flow rate of 40 L/min and a hydrogen flow rate of 5 L/min, thereby forming coated articles bearing a thermal sprayed layer having a thickness of about 200 µm and a white color. Measurement of the L*a*b* color of this thermal sprayed layer yielded the following values: L*=91.50, a*=−0.08, b*=−0.17. The carbon content was 0.005%. These coated articles were set in a reactive ion plasma etching system together with a resist-coated silicon wafer, and subjected to a plasma exposure test at a frequency of 13.56 MHz and a plasma output of 1,000 W. The type of gas used in the test was $CF_4+O_2$ (20 vol %), the flow rate was 50 sccm, and the gas pressure was 50 mTorr. Following the test, the coated articles were removed and the thermal sprayed surface layer thereon was found to have turned brown in places.

Example 3

1 kg of yttrium oxide powder, 1.5 liters of 3 wt % polyvinylalcohol solution and 1.5 g of titanium chloride ($TiCl_3$) were mixed to prepare a slurry. The slurry was spray dried to form granulates. Thereafter, the granulates were subjected to firing at 1600° C. for 1 hour in a stream of argon and then screening with a #200 sieve, thereby producing a thermal spraying powder.

This thermal spraying powder was applied to aluminum alloy articles by atmospheric pressure plasma spraying using an argon/hydrogen mixed gas, thereby forming coated articles bearing a thermal sprayed layer having a thickness of about 200 µm. Measurement of the L*a*b* color of this thermal sprayed layer yielded the following values: L*=40.21, a*=0.22, b*=−0.04. These coated articles were set in a reactive ion plasma etching system together with a resist-coated silicon wafer, and subjected to a plasma exposure test at a frequency of 13.56 MHz and a plasma output of 1,000 W. The type of gas used in the test was $CF_4+O_2$ (20 vol %), the flow rate was 50 sccm, and the gas pressure was 50 mTorr. No local color changes in the surface layer were apparent upon visual inspection.

Example 4

1 kg of yttrium oxide powder, 1.5 liters of 3 wt % polyvinylalcohol solution and 2.0 g of molybdenum chloride ($MoCl_5$) were mixed to prepare a slurry. The slurry was spray dried to form granulates. Thereafter, the granulates were subjected to firing at 1600° C. for 1 hour in a stream of argon and then screening with a #200 sieve, thereby producing a thermal spraying powder.

This thermal spraying powder was applied to aluminum alloy articles by atmospheric pressure plasma spraying using an argon/hydrogen mixed gas, thereby forming coated articles bearing a thermal sprayed layer having a thickness of about 200 µm. Measurement of the L*a*b* color of this thermal sprayed layer yielded the following values: L*=42.53, a*=−0.19, b*=−0.33. These coated articles were set in a reactive ion plasma etching system together with a resist-coated silicon wafer, and subjected to a plasma exposure test at a frequency of 13.56 MHz and a plasma output of 1,000 W. The type of gas used in the test was $CF_4+O_2$ (20 vol %), the flow rate was 50 sccm, and the gas pressure was 50 mTorr. No local color changes in the layer were apparent upon visual inspection.

The thermal spraying powder of the present invention enables rare-earth oxide thermal spray coated articles having a gray or black color to be fabricated by atmospheric pressure plasma spraying, thus making it possible to reduce production costs. When carbide microdrills are fired on a sintering tray that has been thermal spray coated with a rare-earth oxide powder of a gray or black color, the radiation at elevated temperatures becomes more uniform, enabling the production of cemented carbide bodies having minimal warp. Moreover, when a thermal spray coated article according to the invention is used as a plasma erosion resistant component in a halogen gas, local discoloration is limited. As a result, when taken out and cleaned, the component is not excessively cleaned in places, allowing it to achieve its inherently long service life.

Japanese Patent Application No. 2002-211400 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A rare-earth oxide thermal spray coated article comprising:
   a substrate and
   a coating layer formed by thermally spraying a rare-earth oxide thermal spraying powder onto a surface of the substrate,
   said coating layer being of a gray or black color having, in the L*a*b* color space, an L* value of up to 50, an a* value of −3.0 to +3.0, and a b* value of −3.0 to +3.0 and containing carbon or molybdenum.

2. A rare-earth oxide thermal spray coated article comprising:

a substrate and a coating layer formed by thermally spraying a rare-earth oxide thermal spraying powder onto a surface of the substrate, said coating layer being of a gray or black color having, in the L*a*b* color space, an L* value of up to 50, an a value of −3.0 to +3.0, and a b* value of −3.0 to +3.0 wherein the coating layer has a carbon content of 0.1 to 2% by weight or a titanium or molybdenum content of 1 to 1000 ppm.

3. A rare-earth oxide powder for thermal spraying, which powder is of a gray or black color having, in the L*a*b* color space, an L* value of up to 50, an a* value of −3.0 to +3.0 and a b* value of −3.0 to +3.0 and containing carbon or molybdenum.

4. A The rare-earth oxide powder for thermal spraying, which powder is of a gray or black color having, in the L*a*b* color space, an L* value of up to 50, an a* value of −3.0 to +3.0 and a b* value of −3.0 to +3.0, wherein the powder has a carbon content of 0.1 to 2% by weight or a titanium or molybdenum content of 1 to 1000 ppm.

5. A rare-earth oxide powder for thermal spraying, which powder is of a gray or black color having, in the L*a*b* color space, an L* value of up to 50, an a* value of −3.0 to +3.0 and a b* value of −3.0 to +3.0, wherein the powder has a carbon content of 0.1 to 2% by weight.

6. A rare-earth oxide powder for thermal spraying, which powder is of a gray or black color having, in the L*a*b* color space, an L* value of up to 50, an a value of −3.0 to +3.0 and a b* value of −3.0 to +3.0, wherein the powder has a titanium content of 1 to 1000 ppm.

7. A rare-earth oxide powder for thermal spraying, which powder is of a gray or black color having, in the L*a*b* color space, an L* value of up to 50, an a* value of −3.0 to +3.0 and a b* value of −3.0 to +3.0, wherein the powder has a molybdenum content of 1 to 1000 ppm.

* * * * *